(12) United States Patent   (10) Patent No.: US 9,185,709 B2
Einsig                          (45) Date of Patent:  Nov. 10, 2015

(54) LONG TERM EVOLUTION WIRELESS COMMUNICATION SYSTEM AND RELATED METHODS

(75) Inventor: Barry Einsig, Red Lion, PA (US)

(73) Assignee: HARRIS CORPORATION, Melbourne, FL (US)

( * ) Notice: Subject to any disclaimer, the term of this patent is extended or adjusted under 35 U.S.C. 154(b) by 968 days.

(21) Appl. No.: 13/353,065

(22) Filed: Jan. 18, 2012

(65) Prior Publication Data

US 2013/0185755 A1   Jul. 18, 2013

(51) Int. Cl.
*H04W 72/00* (2009.01)
*H04W 72/04* (2009.01)
*H04N 21/61* (2011.01)
*H04N 21/643* (2011.01)

(52) U.S. Cl.
CPC ....... *H04W 72/0486* (2013.01); *H04N 21/6106* (2013.01); *H04N 21/643* (2013.01); *H04W 72/0453* (2013.01)

(58) Field of Classification Search
CPC . H04W 72/04; H04W 8/245; H04M 1/72519; H04L 47/10
USPC .......................... 455/450, 418, 550.1; 370/235
See application file for complete search history.

(56) References Cited

U.S. PATENT DOCUMENTS

| 6,757,273 | B1* | 6/2004 | Hsu et al. ..................... 370/349 |
| 7,692,681 | B2  | 4/2010 | Rengaraju et al. ......... 348/14.08 |
| 7,769,389 | B1* | 8/2010 | Mangal et al. ............. 455/452.1 |
| 2004/0010592 | A1* | 1/2004 | Carver et al. ................ 709/226 |
| 2005/0271009 | A1* | 12/2005 | Shirakabe et al. ............ 370/329 |
| 2006/0121924 | A1  | 6/2006 | Rengaraju et al. |
| 2007/0201388 | A1* | 8/2007 | Shah et al. .................... 370/300 |
| 2008/0200146 | A1  | 8/2008 | Wang et al. ................... 455/410 |
| 2009/0094649 | A1  | 4/2009 | Patel ............................... 725/86 |
| 2009/0141690 | A1  | 6/2009 | Fan et al. ...................... 370/335 |
| 2009/0185619 | A1* | 7/2009 | Taleb et al. .............. 375/240.02 |
| 2010/0159976 | A1  | 6/2010 | Marocchi et al. ............. 455/519 |
| 2010/0317339 | A1* | 12/2010 | Koc .............................. 455/424 |
| 2011/0067072 | A1  | 3/2011 | Parekh et al. |
| 2011/0212731 | A1* | 9/2011 | Lee et al. ....................... 455/450 |
| 2011/0258159 | A1  | 10/2011 | Mitchell ....................... 707/613 |
| 2011/0317543 | A1* | 12/2011 | Medina et al. ................ 370/216 |
| 2012/0008499 | A1  | 1/2012 | Stanwood et al. |
| 2012/0063373 | A1* | 3/2012 | Chincholi et al. ............ 370/281 |
| 2012/0163309 | A1* | 6/2012 | Ma et al. ....................... 370/329 |

OTHER PUBLICATIONS $3^{RD}$ Generation Partnership Project; Technical Specification Group Services and System Aspects; Service accessibility, (Release 8); V8.9.0, Sep. 2009, pp. 1-27.

* cited by examiner

*Primary Examiner* — Danh Le
(74) *Attorney, Agent, or Firm* — Allen, Dyer, Doppelt, Milbrath & Gilchrist, P.A.

(57) ABSTRACT

An LTE wireless communication system includes an LTE base station, and mobile wireless communications devices. Each mobile wireless communications device exchanges video data with another mobile wireless communications device via the LTE base station and by sending at least one of a PTV request and an RTV request to the LTE base station. The LTE base station is configured, when network traffic is below a threshold value, to allocate bandwidth for a PTV connection between a given mobile wireless communications device and a given other mobile wireless communications device, and, when the network traffic exceeds the threshold value, to allocate bandwidth for an RTV connection between the given mobile wireless communications device and the given other mobile wireless communications device.

26 Claims, 4 Drawing Sheets

LONG TERM EVOLUTION WIRELESS COMMUNICATION SYSTEM AND RELATED METHODS

FIELD OF THE INVENTION

The present invention relates to the field of wireless communications, and, more particularly, to a long term evolution wireless communication system and related methods.

BACKGROUND OF THE INVENTION

A typical wireless communications system comprises a plurality of wireless communications devices exchanging data with each other. In some wireless communications systems, for example, infrastructure networks, the system may further comprise a wireless base station for managing communications between the wireless communications devices. In other words, each intra-system communication would be exchanged via the wireless base station. In other wireless communications systems, for example, mesh networks and ad hoc wireless networks, the wireless base station may be omitted, i.e. the wireless communications devices may communicate directly with each other.

The wireless communications devices may communicate with each other based upon a wireless communications protocol. The 3rd Generation Partnership Project Long Term Evolution (3GPP LTE) wireless communications protocol is a robust technology aimed at providing metropolitan area networks, as disclosed in the 3GPP TS 22.011 V8.9.0 (2009-09) Technical Specification, which is hereby incorporated by reference in its entirety. In particular, the LTE wireless protocol is commonly referred to as the fourth generation cellular protocol.

The LTE wireless communications protocol may provide for: increased bandwidth, low latency, and increased signal penetration. Moreover, the LTE wireless communications protocol provides an entirely packet switched protocol for both voice and data, and a simplified infrastructure that is easily integrated into legacy systems.

In public safety applications, a municipality may provide an LTE wireless network for use by personnel, such as law enforcement and maintenance workers. As with typical infrastructure networks, the LTE wireless network may suffer sub-par performance in network sectors experiencing high user density, for example, during large events, such as sports events at large capacity stadiums. During these situations, the LTE wireless network throughput may be reduced significantly, effectively rendering the wireless communication system inoperative. This drawback may be worsened in the typical municipal LTE wireless network since they are typically built with lower thresholds for capacity at cell edges, aggregate throughput at single sites, and extended backhaul.

One approach to this drawback is included in the LTE wireless communications protocol, this approach comprising the barring factor feature. In the LTE wireless communications protocol, each mobile wireless communications device has an access class associated with it, the access classes being assigned corresponding to numerical values of 0-15. In the typical LTE wireless communication system, access classes 11-15 are reserved for special users, i.e. Class 15—PLMN Staff; Class 14—Emergency Services; Class 13—Public Utilities (e.g. water/gas suppliers); Class 12—Security Services; and Class 11—PLMN Use.

Another approach to priority in an LTE wireless communication system is disclosed in U.S. Patent Application Publication No. 2008/0200146 to Wang et al. Wang et al. uses the 11-15 access classes to provide priority similar to that of the typical LTE wireless communication system with special provisioning to make emergency calls.

SUMMARY OF THE INVENTION

In view of the foregoing background, it is therefore an object of the present invention to provide an LTE wireless communication system that is efficient and provides video data transfer and exchange.

This and other objects, features, and advantages in accordance with the present invention are provided by an LTE wireless communication system comprising an LTE base station, and a plurality of mobile wireless communications devices, each mobile wireless communications device configured to exchange video data to at least one other mobile wireless communications device via the LTE base station and by sending at least one of a push-to-video (PTV) request and a request-to-video (RTV) request to the LTE base station. The LTE base station is configured, when network traffic is below a threshold value, to allocate bandwidth for a PTV connection between a given mobile wireless communications device and a given at least one other mobile wireless communications device, and when the network traffic exceeds the threshold value, allocate bandwidth for an RTV connection between the given mobile wireless communications device and the given at least one other mobile wireless communications device. Advantageously, the LTE wireless communication system may provide readily available video data communications during applications that generate network stress.

More specifically, each mobile wireless communications device may be configured to exchange the video data with a plurality of other mobile wireless communications devices. In some embodiments, the LTE wireless communication system may further comprise a dispatch operation center cooperating with the LTE base station. The dispatch operation center may be configured to cooperate with the LTE base station for allocating the bandwidth for the RTV connection between the given mobile wireless communications device and the given at least one other mobile wireless communications device based upon at least one priority characteristic thereof. For example, the at least one priority characteristic may comprise mobile wireless communications device location data.

Each mobile wireless communications device may be configured to send a priority request to video (PRTV) request to the dispatch operation center. The dispatch operation center may be configured to establish a video communication link with the given mobile wireless communications device.

The dispatch operation center may allocate the bandwidth for the RTV connection between the given mobile wireless communications device and the given at least one other mobile wireless communications device based upon video content of the video communication link. Each of the mobile wireless communications devices may be configured to send the video data having at least one common quality of service (QoS) characteristic value. For example, the at least one common QoS characteristic value may comprise at least one of a latency value and a video quality value. In some embodiments, the LTE wireless communication system may further comprise at least one mobile LTE base station in a geographical area, and the LTE base station may be configured to selectively change the threshold value for the network traffic in the geographical area based upon the at least one mobile LTE base station.

Another aspect is directed to a method of operating an LTE wireless communication system comprising an LTE base station, and a plurality of mobile wireless communications devices. The method comprises exchanging video data from each mobile wireless communications device to at least one other mobile wireless communications device via the LTE base station by sending at least one of a PTV request and an RTV request to the LTE base station. The method includes, when network traffic is below a threshold value, allocating bandwidth by the LTE base station for a PTV connection between a given mobile wireless communications device and a given at least one other mobile wireless communications device, and when the network traffic exceeds the threshold value, allocating bandwidth for an RTV connection between the given mobile wireless communications device and the given at least one other mobile wireless communications device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
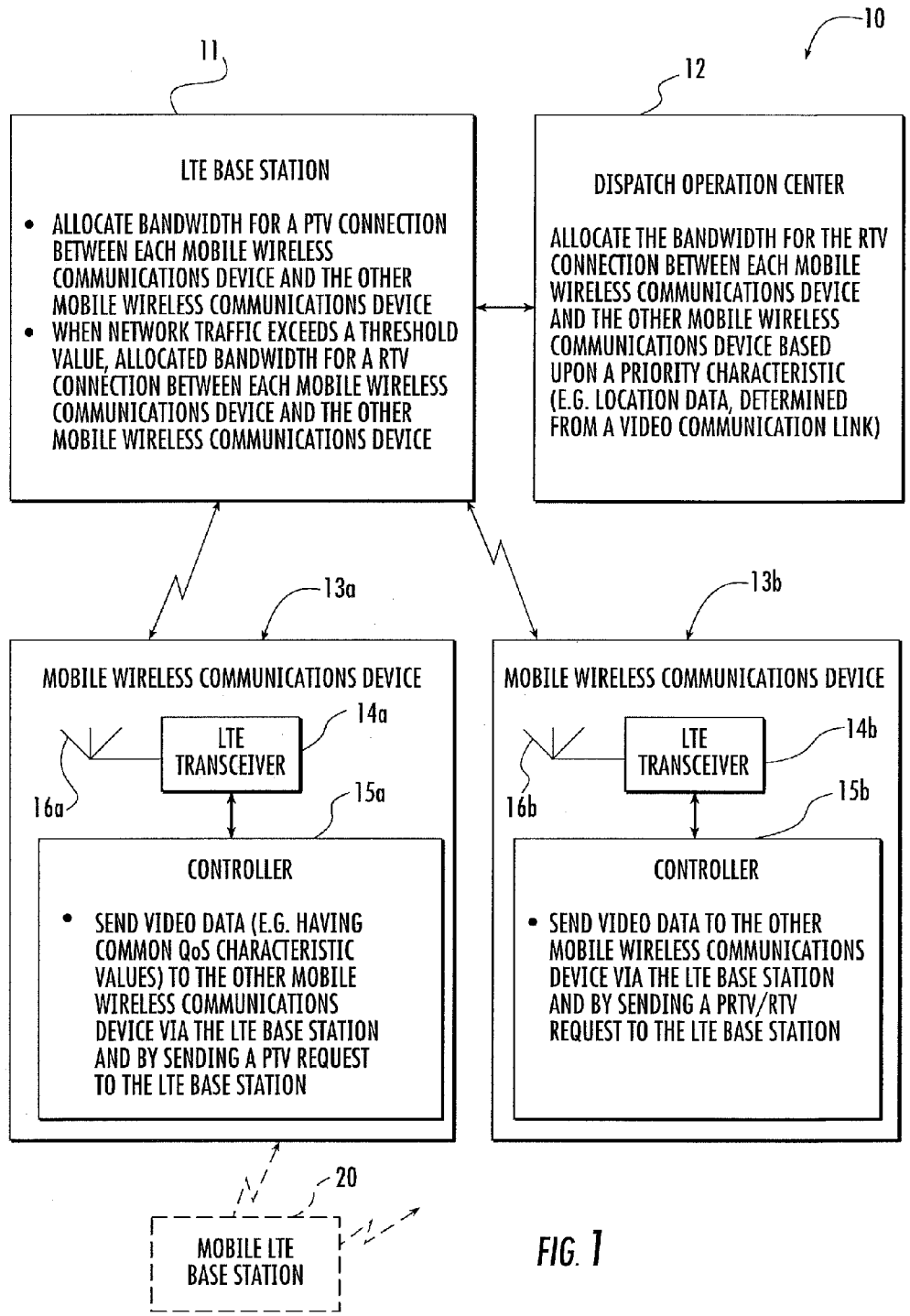
FIG. 1 is a schematic block diagram of an LTE wireless communication system, according to the present invention.
Figure 2:
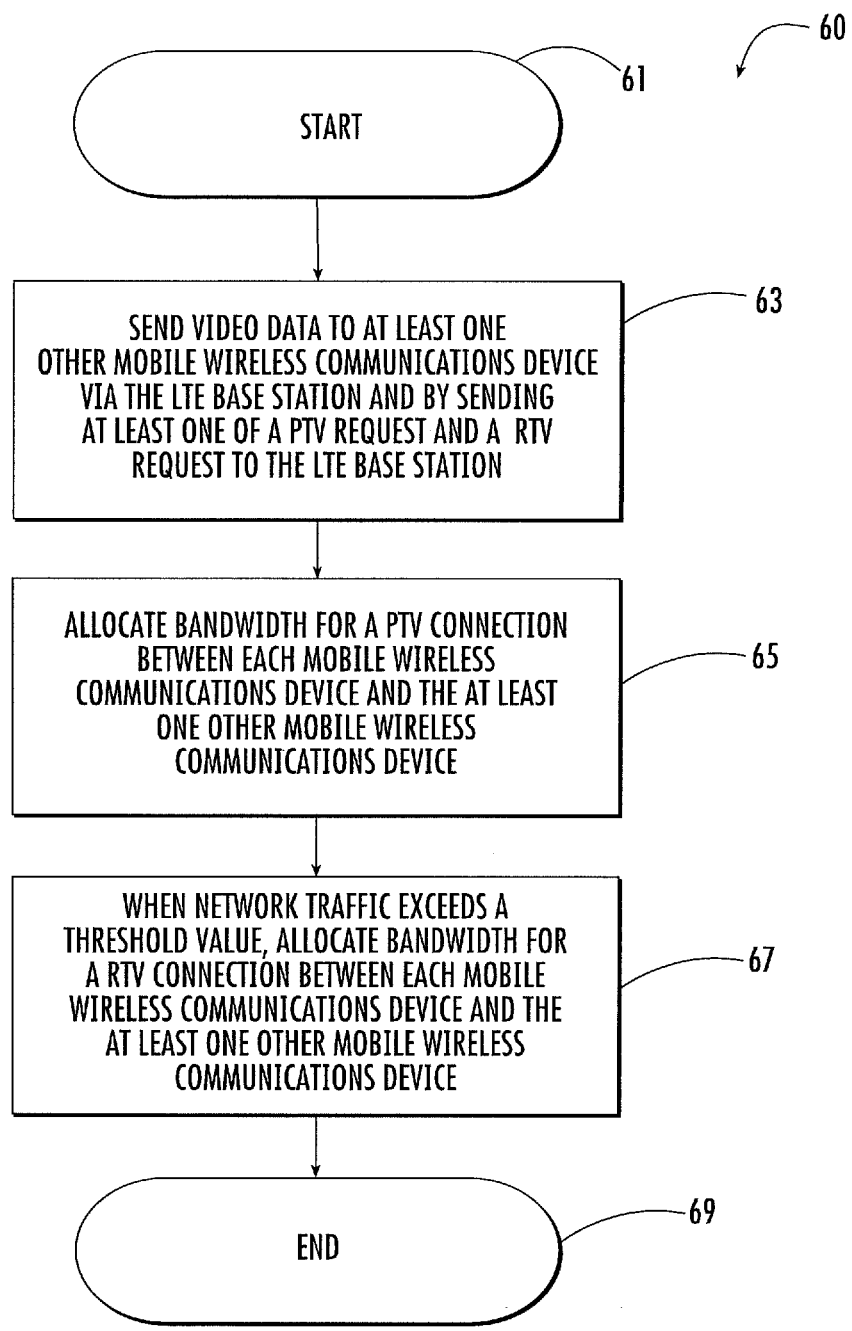
FIG. 2 is a flowchart illustrating operation of the LTE wireless communication system of FIG. 1.
Figure 3:
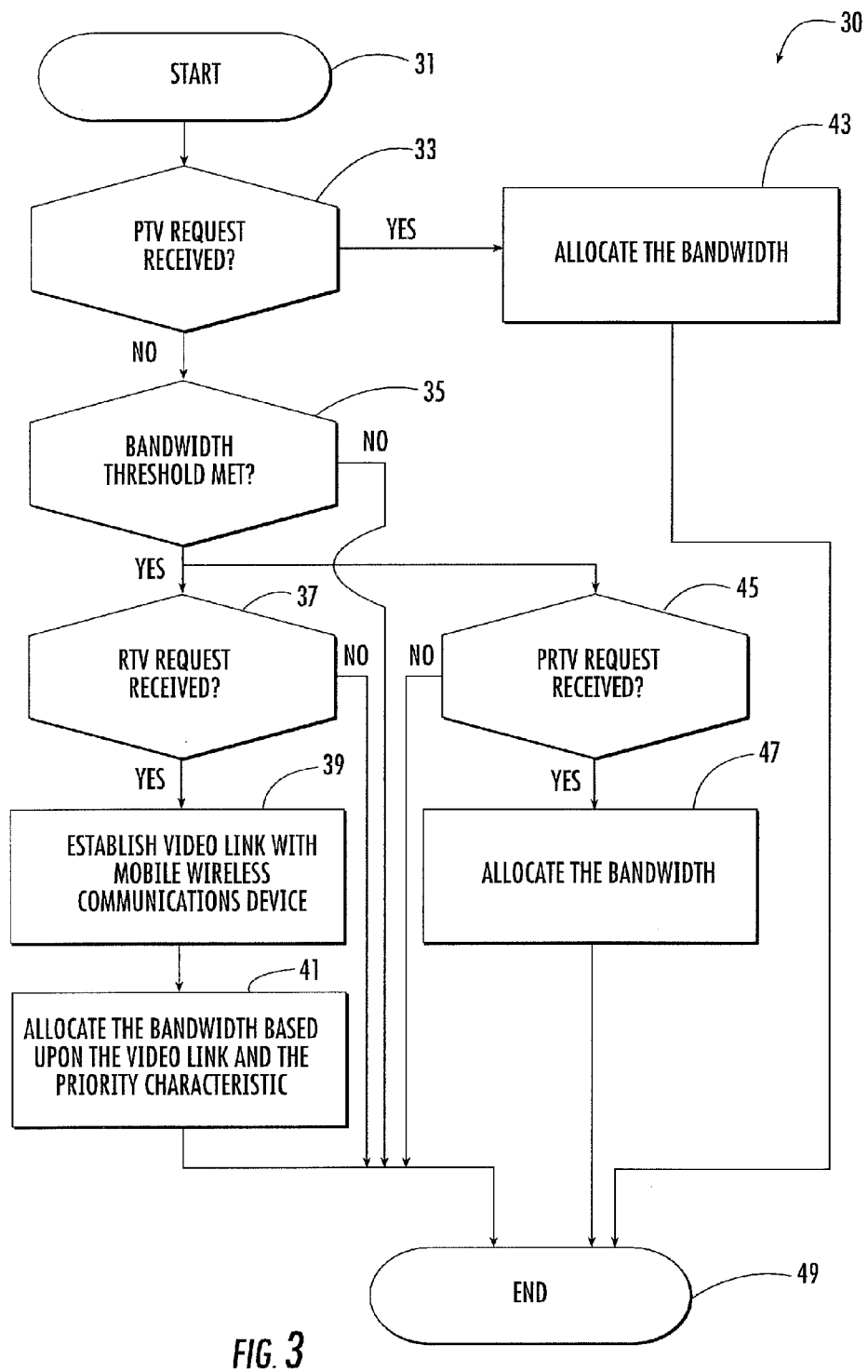
FIG. 3 is a detailed flowchart illustrating operation of the LTE wireless communication system of FIG. 1.

Referring initially to FIGS. 1-3, an LTE wireless communication system 10 according to the present invention and flowcharts 30, 60 illustrating operation of the LTE wireless communication system are now described. The LTE wireless communication system 10 includes an LTE base station 11, and a plurality of mobile wireless communications devices 13a-13b. Each mobile wireless communications device 13a-13b illustratively includes a controller 15a-15b, for example, a microprocessor, an LTE transceiver 14a-14b coupled to the controller, and an antenna 16a-16b coupled to the LTE transceiver. The mobile wireless communications devices 13a-13b may also each include an additional cellular transceiver, such as GSM or CDMA transceivers, a global positioning system (GPS) antenna, a WiFi (IEEE 802.11) transceiver, and a WiMax network (IEEE802.16). The LTE wireless communication system 10 illustratively includes a dispatch operation center 12. In some embodiments, the dispatch operation center 12 may be staffed with human operators, but in others, the dispatch operation center may be completely automated and operated via computer based intelligence based upon voice recognition technology.

During operation, a given mobile wireless communications device 13a-13b may need to exchange (i.e. at least one of sending and receiving data) video data within the LTE wireless communication system 10. In some embodiments, the given mobile wireless communications device 13a-13b may be configured to send the video data having common QoS characteristic values. For example, the common QoS characteristic values may comprise at least one of a latency value, a video quality value, an audio quality value, a packet size, and a GPS position value. In other words, the video data being exchanged between the mobile wireless communications devices 13a-13b is formatted to a common standard, enhancing predictability of bandwidth consumption as the number of devices increases and permitting excellent design and scalability.

If the given mobile wireless communications device 13a-13b is within coverage of the LTE wireless communication system 10, the device establishes a connection with the LTE base station 11 and camps to the network. If the given mobile wireless communications device 13a-13b needs to send video data to another mobile wireless communications device via the LTE base station 11, the device is configured to send one of a PTV request and an RTV request to the LTE base station (Blocks 31, 33, 61, 63). Of course, this is predicated on the given mobile wireless communications device 13a-13b being able to camp to the LTE wireless communication system 10. If the given mobile wireless communications device 13a-13b is unable to connect to a local LTE base station 11 or if the connection established is too poor to permit any video data exchange, the user is presented with a prompt on a display of the given mobile wireless communications device, the prompt indicating that connection is too poor to permit video data exchange.

As described in detail below, the given mobile wireless communications device 13a-13b decides whether to send either the PTV or RTV request based upon traffic conditions, or in some embodiments, it may be pre-programmed. As will be appreciated by those skilled in the art, the PTV/RTV request may be directed to one or more recipients, i.e. although the given mobile wireless communications device 13a-13b illustratively communicates the video data to only one other device, the given device is capable of directing such communications to more than one other mobile wireless communications device.

The PTV request provides the given mobile wireless communications device 13a-13b with rapid one-way video communications. More specifically, the user of the given mobile wireless communications device 13a-13b presses and holds a "PTV" button, which is located conveniently on an outer surface of the housing (in other embodiments, there may be no physical "PTV" button but rather it is initiated by a software command), and the LTE base station 11 allocates and locks the bandwidth necessary for streaming this video data live from the given mobile wireless communications device 13a-13b to the one or more recipients. Once the user releases the PTV button, the bandwidth is released for general system consumption. On the other hand, the RTV request is quite different. Indeed, it is a data message sent to the LTE base station 11 with details of the video data that needs to be transmitted. This RTV request is placed in a queue until the LTE base station 11 decides whether to allocate the needed bandwidth.

When traffic on the LTE wireless communication system 10 is normal, i.e. below an established (traffic) threshold value, the LTE base station 11 is configured to allocate bandwidth for a PTV connection between the given mobile wireless communications device 13a-13b and the other mobile wireless communications device (Blocks 43, 65). In other words, the LTE base station 11 receives the PTV request and allocates the bandwidth for the connection as quickly as possible.

When network traffic exceeds the traffic threshold value, to reduce the chances of network gridlock, the LTE base station 11 may be configured to alert the given mobile wireless communications device, for example, by sending out an alert broadcast message of this condition (Block 35). In certain embodiments, the given mobile wireless device 13a-13b will recognize this broadcast and only send RTV requests and no longer send PTV requests. In other embodiments, the ability to send PTV request will be assigned only to high priority users, and low priority users will be permanently locked into RTV status.

The LTE base station 11 is configured to allocate bandwidth for an RTV connection between the given mobile wireless communications device 13a-13b and the other mobile wireless communications device (Blocks 37, 67). During these situations, the dispatch operation center 12 is configured to cooperate with the LTE base station 11 for allocating the bandwidth for the RTV connection between the given mobile wireless communications device 13a-13b and the other mobile wireless communications device based upon at least one priority characteristic thereof. For example, the priority characteristic may comprise mobile wireless communications device location data, such as the video data is originating from a first responder zone, thereby giving the video data a higher priority. This mobile wireless communications device location data may be transmitted to the dispatch operation center 12 via the given mobile wireless communications device 13a-13b, which may derive this info via an onboard GPS antenna or by cellular triangulation.

In certain embodiments, the operator may establish an audio, low bandwidth, connection with the given mobile wireless communications device 13a-13b and determine the priority of the requested video data being sent. In other embodiments, the dispatch operation center 12 may be configured to establish a video communication link with the given mobile wireless communications device 13a-13b (Blocks 39, 41). In other words, a human operator at the dispatch operation center 12 has access to the video communication link and can ascertain the priority of the requested communication link and determine whether an allocation of bandwidth should be made. For example, if the human operator can assess that there is an emergency situation, the human operator can quickly permit the allocation of needed bandwidth for the video data to be transmitted from the given mobile wireless communications device 13a-13b. Additionally, the dispatch operation center 12 can initiate the video communication link independently and without the requirement of there being a RTV request from the given mobile wireless communications device 13a-13b. For example, if the given mobile wireless communications device 13a-13b is attached to a vehicle which has not moved in some time, the video communication link can be made to determine if there is an emergency.

In some embodiments, the LTE base station 11 may optionally comprise a mobile base station 20 (FIG. 1: shown with dashed lines), for example, a vehicular mobile base station or a light weight tripod base station. During high use situations for a geographical area, the network operator may deploy one or more mobile LTE base stations in the same geographical area to provide greater throughput for the LTE wireless communication system 10. Moreover, the LTE wireless communication system 10 may adjust the established (traffic) threshold value based upon the deployment of these mobile base stations 20, i.e. by increasing the threshold value, and thereby affecting the allocation of bandwidth to the mobile wireless communications devices 13a-13b. Moreover, the administrator of the LTE wireless communication system 10 may reassign PTV and RTV rights in the system based upon the newly available throughput provided by the mobile base stations 20.

In some embodiments, the administrator of the LTE wireless communication system 10 may selectively reassign PTV rights to certain personnel at a geographical region. For example, the administrator of the LTE wireless communication system 10 may reassign a device associated with a first responder commander for PTV rights.

Figure 4:
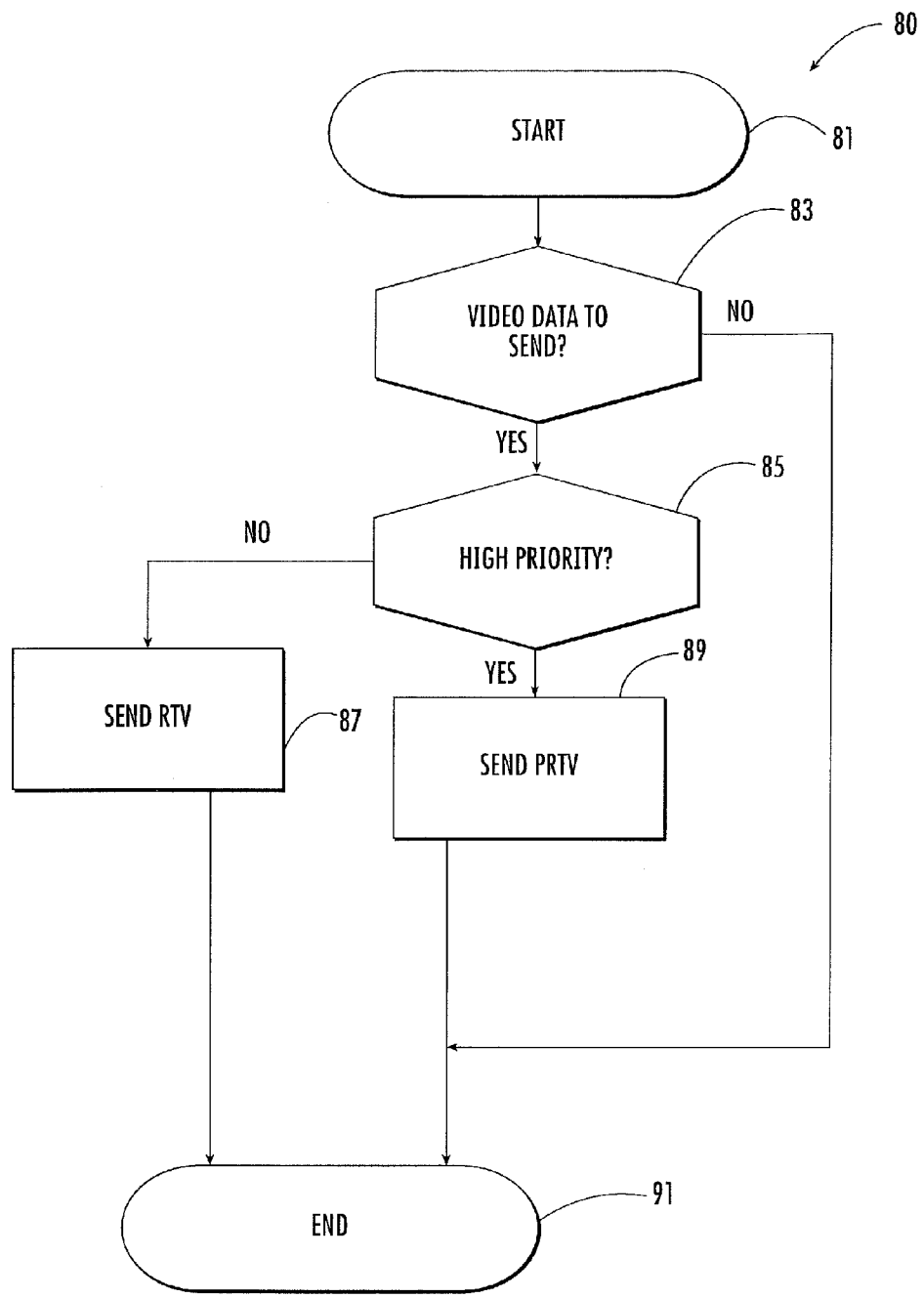
FIG. 4 is a flowchart illustrating operation of the mobile wireless communications device of FIG. 1.

Referring now additionally to FIG. 4, a flowchart 80 illustrates a method of selecting when to send a PRTV request (Block 81). If the user of the given mobile wireless communications device 13a-13b has high priority video data to send, the device may be configured to send a PRTV request to the dispatch operation center (Blocks 83, 85, 89). The PRTV operates quite similarly to RTV request, but with enhanced priority at the dispatch operation center 12. For example, in the illustrated embodiment, this results in automatic bandwidth allocation (Blocks 45, 47, 49, 69). In other embodiments, the PRTV request may receive enhanced priority at the dispatch operation center 12, i.e. human operator may assess the PRTV request before any other RTV requests. If the given mobile wireless communications device 13a-13b does not have high priority video data to send, the device sends an RTV request and awaits bandwidth allocation (Blocks 87, 91).

Advantageously, the LTE wireless communication system 10 provides efficient and managed video data communications within the network framework. This may enable private LTE wireless communication systems to be deployed including less infrastructure resources than the typical system, yet still meet performance requirements. For example, the LTE wireless communication system 10 may include fewer base stations and more microwave backhaul base stations and still provide effective video data communications. In particular, in applications where the deployment of the system is based upon a value added engineering process, the LTE wireless communication system 10 provides equivalent performance without the high costs of numerous fiber backed base stations.

Another aspect is directed to a method of operating an LTE wireless communication system 10 comprising an LTE base station 11, and a plurality of mobile wireless communications devices 13a-13b. The method comprises sending video data from each mobile wireless communications device 13a-13b to at least one other mobile wireless communications device via the LTE base station 11 by sending at least one of a PTV request and an RTV request to the LTE base station, and when network traffic is below a threshold value, allocating bandwidth by the LTE base station for a PTV connection between each mobile wireless communications device and the at least one other mobile wireless communications device, and when the network traffic exceeds the threshold value, allocating bandwidth for an RTV connection between each mobile wireless communications device and the at least one other mobile wireless communications device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A long term evolution (LTE) wireless communication system comprising:
    an LTE base station; and
    a plurality of mobile wireless communications devices, each mobile wireless communications device configured to exchange video data with at least one other mobile wireless communications device via said LTE base station and by sending at least one of a push-to-video (PTV) request and a request-to-video (RTV) request to said LTE base station;

said LTE base station configured to
when network traffic is below a threshold value, allocate bandwidth for a PTV connection between a given mobile wireless communications device and a given at least one other mobile wireless communications device, and
when the network traffic exceeds the threshold value, allocate bandwidth for an RTV connection between the given mobile wireless communications device and the given at least one other mobile wireless communications device.

2. The LTE wireless communication system of claim 1 wherein each mobile wireless communications device is configured to exchange the video data with a plurality of other mobile wireless communications devices.

3. The LTE wireless communication system of claim 1 further comprising a dispatch operation center cooperating with said LTE base station.

4. The LTE wireless communication system of claim 3 wherein said dispatch operation center is configured to cooperate with said LTE base station for allocating the bandwidth for the RTV connection between the given mobile wireless communications device and the given at least one other mobile wireless communications device based upon at least one priority characteristic thereof.

5. The LTE wireless communication system of claim 4 wherein the at least one priority characteristic comprises mobile wireless communications device location data.

6. The LTE wireless communication system of claim 3 wherein each mobile wireless communications device is configured to send a priority request to video (PRTV) request to said dispatch operation center.

7. The LTE wireless communication system of claim 3 wherein said dispatch operation center is configured to establish a video communication link with the given mobile wireless communications device.

8. The LTE wireless communication system of claim 7 wherein said dispatch operation center allocates the bandwidth for the RTV connection between the given mobile wireless communications device and the given at least one other mobile wireless communications device based upon video content of the video communication link.

9. The LTE wireless communication system of claim 1 wherein each of the mobile wireless communications devices is configured to send the video data having at least one common quality of service (QoS) characteristic value.

10. The LTE wireless communication system of claim 9 wherein the at least one common QoS characteristic value comprises at least one of a latency value and a video quality value.

11. The LTE wireless communication system of claim 1 further comprising at least one mobile LTE base station in a geographical area; and wherein said LTE base station is configured to selectively change the threshold value for the network traffic in the geographical area based upon said at least one mobile LTE base station.

12. A long term evolution (LTE) wireless communication system comprising:
an LTE base station and a dispatch operation center cooperating with said LTE base station; and
a plurality of mobile wireless communications devices, each mobile wireless communications device configured to exchange video data with at least one other mobile wireless communications device via said LTE base station and by sending at least one of a push-to-video (PTV) request and a request-to-video (RTV) request to said LTE base station, the video data having at least one common quality of service (QoS) characteristic value;

said LTE base station configured to
when network traffic is below a threshold value, allocate bandwidth for a PTV connection between a given mobile wireless communications device and the given at least one other mobile wireless communications device, and
when the network traffic exceeds the threshold value, allocate bandwidth for an RTV connection between the given mobile wireless communications device and the given at least one other mobile wireless communications device.

13. The LTE wireless communication system of claim 12 wherein each mobile wireless communications device is configured to exchange the video data with a plurality of other mobile wireless communications devices.

14. The LTE wireless communication system of claim 12 wherein said dispatch operation center is configured to cooperate with said LTE base station for allocating the bandwidth for the RTV connection between the given mobile wireless communications device and the given at least one other mobile wireless communications device based upon at least one priority characteristic thereof.

15. The LTE wireless communication system of claim 14 wherein the at least one priority characteristic comprises mobile wireless communications device location data.

16. The LTE wireless communication system of claim 12 wherein each mobile wireless communications device is configured to send a priority request to video (PRTV) request to said dispatch operation center.

17. The LTE wireless communication system of claim 12 wherein said dispatch operation center is configured to establish a video communication link with the given mobile wireless communications device.

18. The LTE wireless communication system of claim 17 wherein said dispatch operation center allocates the bandwidth for the RTV connection between the given mobile wireless communications device and the given at least one other mobile wireless communications device based upon video content of the video communication link.

19. A method of operating a long term evolution (LTE) wireless communication system comprising an LTE base station, and a plurality of mobile wireless communications devices, the method comprising:
exchanging video data from each mobile wireless communications device with at least one other mobile wireless communications device via the LTE base station by sending at least one of a push-to-video (PTV) request and a request-to-video (RTV) request to the LTE base station; and
when network traffic is below a threshold value, allocating bandwidth by the LTE base station for a PTV connection between a given mobile wireless communications device and a given at least one other mobile wireless communications device, and when the network traffic exceeds the threshold value, allocating bandwidth for an RTV connection between the given mobile wireless communications device and the given at least one other mobile wireless communications device.

20. The method of claim 19 further comprising each mobile wireless communications device exchanging the video data with a plurality of other mobile wireless communications devices.

21. The method of claim 19 further comprising the LTE base station and a dispatch operation center allocating the bandwidth for the RTV connection between the given mobile wireless communications device and the given at least one other mobile wireless communications device based upon at least one priority characteristic thereof.

22. The method of claim 21 wherein the at least one priority characteristic comprises mobile wireless communications device location data.

23. The method of claim 21 further comprising each mobile wireless communications device sending a priority request to video (PRTV) request to the dispatch operation center.

24. The method of claim 21 further comprising establishing from the dispatch operation center a video communication link with the given mobile wireless communications device.

25. The method of claim 24 further comprising the dispatch operation center allocating the bandwidth for the RTV connection between the given mobile wireless communications device and the given at least one other mobile wireless communications device based upon video content of the video communication link.

26. The method of claim 19 further comprising deploying at least one mobile LTE base station in a geographical area, and selectively changing the threshold value for the network traffic in the geographical area based upon the at least one mobile LTE base station.

* * * * *